Patented Oct. 12, 1926.

1,602,958

UNITED STATES PATENT OFFICE.

PAO NIEN WOO, OF SHANGHAI, CHINA.

FLAVORING COMPOUND AND METHOD OF MAKING SAME.

No Drawing.  Application filed April 15, 1926.  Serial No. 102,306.

The present invention relates to a novel seasoning and flavoring material for use in foods, which is also highly nutritious, and to a method of preparing said material.

The invention comprises the products of hydrolyzation of gluten, in which the hydrolyzation operation has been carried out to the degree as indicated below, the material preferably being in the form of an alkali metal salt, such as the sodium salt.

For the production of the material, in the most advantageous form known to me, I start with wheat gluten, which is first treated with hydrochloric acid, 20 parts of the moist wheat gluten containing say 60–65% of moisture, are mixed with 15 parts of commercial hydrochloric acid, and gently warmed at a temperature of about 60 to 70° C., until the gluten has been dissolved. During the operation of dissolving, the temperature should not be allowed to rise high enough to coagulate the gluten, before solution is complete, because the reaction products produced from coagulated protein are quite different from those produced by uncoagulated protein, and furthermore the yield from coagulated protein is only about half as much as can be obtained from the noncoagulated material.

When the solution of the protein is completed, a small amount of tin, say about 1% based on the gluten used, is added, this being preferable in the form of small granules, not more than about three millimeters in diameter. The mixture of the solution of protein in acid, together with the tin, is placed into an auto-clave and is heated with steam under pressure at about 2 atmospheres, for say 6 to 8 hours, or until the reaction is sufficiently completed. The tin exercises several functions, it has been found to very greatly accelerate the hydrolysis reaction, and at the same time it removes any small quantity of arsenic which might have been present in the hydrochloric acid used (it is well known that commercial hydrochloric acid may contain traces of arsenic). The tin should dissolve rapidly in the acid mixture, the tin being as above stated in a relatively fine condition, and I call attention to the fact that undissolved tin, especially if present in the form of rather large pieces for a considerable time, may cause a partial destruction of the principal reaction products, namely glutaminic acid. This is perhaps due to the fact that the hydrochloride of the acid may be reduced into the corresponding amino-aldehyde, by the nascent hydrogen formed by the interaction of the tin and hydrochloric acid.

The solution is then filtered to remove any impurities of an insoluble nature, and is then evaporated to about one half its original volume, which operation can be conducted at atmospheric pressure, and the concentrated solution can then be allowed to stand at room temperature for about seven days, during which period the hydrochloride of glutaminic acid crystallizes out, together with ammonium chloride and tin chloride, and perhaps other impurities or reaction products. The crystals are separated from the mother liquor and are washed with strong hydrochloric acid.

The crude glutaminic acid hydrochloride is then neutralized with caustic soda, slightly in excess. The said reaction also precipitates any tin present in the form of tin hydroxide, which substance being a white insoluble material acts as a decolorizing agent on the solution, and is separated from the solution by filtration. The sodium chloride and ammonium chloride present in the solution are then separated and removed by evaporation and crystallization, and obviously any slight excess of caustic soda will react upon some of the ammonium chloride, forming free ammonia which would be driven off by the evaporation. The evaporation can be conducted at this stage until the solution is relatively concentrated, say for example until the cooled liquor has a specific gravity of about 1.30. After separation of the crystallized sodium chloride and ammonium chloride, the mother liquor is added to about ten times its volume of 95% alcohol, the material well mixed and allowed to stand, say for over night after which the precipitated sodium salt of glutaminic acid is filtered from the remaining liquor. It will be understood that a lower quantity of a more highly concentrated alcohol can likewise be employed in this operation.

The sodium salt can then be further purified in an appropriate manner if desired, although this may not be necessary.

The product sodium glutaminate thus produced is a substantially white fine powder, which is fairly pure, and is suitable for flavoring foods, for example by addition to soups, gravies, and the like. It likewise can be added to vegetables in order to improve the flavor of the same. If desired a small quantity, say a teaspoonful can be added to a quart of hot water containing a little salt, for preparing a nutritious substitute for beef tea. Such material is found to be highly nutritious and suitable for invalids and the like. The flavor of such material is found very appetizing to most people.

It will be understood that while I have above referred to the use of caustic soda, the other alkalies can likewise be employed.

In the step of heating under pressure, following the addition of tin, steam may be simply blown into the auto-clave, but it is generally more advisable to employ the steam in a coil or jacket, that is to say it is more advisable to employ the steam out of direct contact with the liquid undergoing treatment. I have above spoken of the addition of 1% of metallic tin, although it will be understood that the proportion of tin can be varied more or less, depending upon the particular kind of vegetable protein used, purity of the acid used and other factors. In place of employing wheat gluten, I can use other vegetable proteids, although wheat gluten has given the most satisfactory results thus far.

The dry powdered material sodium glutaminate, has when kept in a closed package, a slight odor somewhat resembling ordinary dried casein. The other alkali metal salts have about the same odor. The taste of the other alkali metal salts is quite similar to that of the sodium salt (both in dilute solutions of the same concentration) but the other alkali metals of course alter the taste a little.

The product is white or substantially white when pure, but as prepared may be a somewhat gray or buff color, depending on the degree of purity.

The hydrochloric acid mentioned in the specific example may be of a specific gravity of about 1.16. It will be understood that an equivalent amount of a more dilute acid can be used, or other hydrohalide acids can be used in equivalent proportion.

I claim:—

1. The herein described process which comprises dissolving vegetable protein in hydrochloric acid, at a temperature below the coagulating point of protein, adding a small amount of metallic tin subjecting to hydrolysis at a temperature above 100° C., for 6 to 8 hours, concentrating the solution, adding sufficient alkali to decompose the hydrochoride and to precipitate dissolved tin, removing the precipitate, removing the major part of the mineral salts contained and precipitating with alcohol.

2. In the preparation of edible products from vegetable proteids the steps of adding metallic tin to a solution of proteid substance in acid, and heating to effect hydrolysis.

3. In the preparation of edible products from vegetable proteids, the steps of adding metallic tin to a solution of proteid substance in a hydrohalide acid, and heating to over 100° C., under pressure, to effect hydrolysis.

4. In the preparation of edible products from vegetable proteids, the steps of dissolving vegetable proteid in a hydrohalide acid while at a temperature above atmospheric but too low to cause coagulation of the proteid, adding metallic tin to the solution and heating to effect hydrolysis.

In testimony whereof I affix my signature.

WOO, PAO NIEN.